United States Patent [19]

Kusuki et al.

[11] Patent Number: 5,141,642
[45] Date of Patent: Aug. 25, 1992

[54] AROMATIC POLYIMIDE DOUBLE LAYERED HOLLOW FILAMENTARY MEMBRANE AND PROCESS FOR PRODUCING SAME

[75] Inventors: Yoshihiro Kusuki; Toshimune Yoshinaga; Hiroshi Shimazaki, all of Ichihara, Japan

[73] Assignee: Ube Industries, Ltd., Ube, Japan

[21] Appl. No.: 333,950

[22] Filed: Apr. 6, 1989

[51] Int. Cl.⁵ .............................................. B01D 69/08
[52] U.S. Cl. .............................. 210/490; 210/500.23; 210/500.39; 427/246
[58] Field of Search ............. 210/500.23, 490, 500.39; 264/41, 199, 209; 427/245, 246

[56] References Cited

U.S. PATENT DOCUMENTS 4,267,047  5/1981  Henne et al. .............. 210/500.25 X
4,440,643  4/1984  Makino et al. ............. 210/500.23 X Primary Examiner—Frank Spear
Attorney, Agent, or Firm—Finnegan, Henderson, Farabow, Garrett & Dunner

[57] ABSTRACT

An aromatic polyimide double layered hollow filamentary membrane having an excellent heat resistance, chemical resistance, pressure-resistance, and gas-permeating and separating properties comprises (A) an aromatic imide polymer hollow filamentary microporous inner layer and (B) an aromatic imide polymer tubular filamentary asymmetric outer layer composed of (a) tubular filamentary microporous intermediate layer covering and united with the outside surface of the inner layer (A) and (b) a thin dense outside surface layer covering and united with the intermediate layer (a).

21 Claims, 2 Drawing Sheets

AROMATIC POLYIMIDE DOUBLE LAYERED HOLLOW FILAMENTARY MEMBRANE AND PROCESS FOR PRODUCING SAME

BACKGROUND OF THE INVENTION

1) Field of the Invention

The present invention relates to an aromatic polyimide double layered hollow filamentary membrane and a process for producing the same. More particularly, the present invention relates to an aromatic polyimide double layered hollow filamentary membrane having an excellent gas-permeating and separating property, heat resistance, chemical resistance, and pressure resistance and useful as a reverse osmosis membrane, ultrafiltration membrane, gas-separating membrane, for example, hydrogen-separating membrane, carbon dioxide-separating membrane or oxygen-concentrating membrane, pervaporation membrane, organic vapor-dehydration membrane, and dehumidification membrane, and a process for producing same at a high reproductivity and efficiency.

2) Description of the Related Arts

Various types of separation membranes are currently utilized for energy saving in the technical fields of separation, concentration, and refining of substances, and the importance of this technology is growing.

There have been many attempts to provide separating membranes, by various methods, and the known separation membranes are usually composed of a separating resinous layer for separating a substance and a supporting layer for imparting a mechanical strength to the membrane.

The known methods of producing the separating membranes can be classified into two groups:

1) A method in which a solution of a film-forming polymer is spread to form a thin layer of the solution, and the solution layer is solidified by a drying-coagulating method. In this method, a dense separating layer and a porous supporting layer are simultaneously formed to provide an asymmetric membrane.

2) A method in which a pre-formed porous membrane is used as a supporting layer and then a dense separating layer is formed on a surface of the supporting layer to provide a composite membrane.

U.S. Pat. No. 4,460,526 discloses a process for producing an asymmetric separating membranes from an aromatic imide polymer, and the resultant membranes exhibit a high heat resistance, chemical resistance, and gas-permeating property.

The conventional hollow filamentary membranes having a satisfactory gas-permeating property are often unsatisfactory due to a poor pressure resistance thereof.

In conventional processes for producing a hollow filamentary membrane, a single spinning solution of a polyimide is used to simultaneously form both the dense separating layer and the porous supporting layer united with the separating layer. Accordingly, it is very difficult to provide a dense separating layer and a porous supporting layer, respectively, having the necessary satisfactory properties for effecting desired functions, from the one and the same polyimide spinning solution by the one and the same spinning procedure. Namely, the type and concentration of the polyimide in the dope solution and the spinning conditions are very restricted; e.g., sometimes the resultant hollow filamentary membrane exhibits unsatisfactory separating and permeating properties, or sometimes the spinning operation requires the expertise of a person specifically skilled in the art. Also, sometimes it is difficult to stably produce the hollow filamentary membrane at a satisfactory reproductivity.

U.S. Pat. No. 4,690,873 discloses a process for producing an asymmetric gas-separating membrane from an asymmetric biphenyltetracarboxylic acid type aromatic imide polymer. In this process, a dope solution is produced by dissolving a solvent-soluble aromatic imide polymer produced from an aromatic tetracarboxylic acid component comprising, as a principal ingredient, a biphenyltetracarboxylic acid and an aromatic diamine component comprising, as a principal ingredient, an aromatic diamine compound having a divalent radical of the formula $-SO_2-$, in an organic solvent, and the resultant dope solution is subjected to a wet membrane-forming method in which a thin layer of the dope solution is solidified in a coagulating liquid, to form an asymmetric gas-separating membrane, which may be in the form of a hollow filament, consisting of a dense outer surface layer and a porous inner layer. The resultant aromatic polyimide gas-separating membrane exhibits an excellent heat resistance and chemical resistance, and a satisfactory carbon dioxide gas-permeating property.

The methods of forming the dense separating layer in a composite membrane are as follows:

(1) a solution of a film-forming polymer in a low concentration is coated in a small thickness on the supporting layer and the thin layer of the polymer solution is dried;

(2) a solution of a film-forming polymer is spread on a water surface, the spread thin layer of the solution is solidified, and the resultant thin membrane is laminated to the supporting layer; and, (3) a solution of a monomeric material is coated on a surface of the supporting layer and the monomeric material is polymerized to form a polymeric membrane on the supporting layer.

In conventional processes for producing the hollow filamentary composite membrane disclosed in U.S. Pat. No. 4,528,004, a thin dense coating layer of a polyimide is formed around a peripheral surface of a porous hollow filamentary membrane, but this coating operation must be carried out under a very accurate and complicated control, to avoid an undesirable formation of pinholes in the coating layer. Therefore, it is difficult to form a thin separating layer having a uniform thickness and substantially no defects such as pinholes on the porous hollow filamentary membrane, at a high reproductivity.

Japanese Unexamined Patent Publication (Kokai) Nos. 49-62,380, 62-191,019 and 64-15,104 disclose multilayered hollow filamentary membranes and processes for producing same from polymeric materials, for example, cellulose acetate, and polyamide.

The conventional multilayered hollow filamentary membranes have an unsatisfactory heat resistance, chemical resistance, and pressure resistance.

In a practical energy-saving gas-separating process, however, the conventional aromatic polyimide gas-separating membrane does not always have a satisfactory pressure resistance and gas-permeability.

Accordingly, there is a strong demand for the provision of a hollow filamentary gas-separating membrane having a high pressure resistance and a satisfactory gas-permeability.

SUMMARY OF THE INVENTION

An object of the present invention is to provide an aromatic polyimide double layered polyimide hollow filamentary membrane having not only an excellent heat and chemical resistance but also an enhanced pressure resistance and a satisfactory gas-permeability, and a process for producing same at a high reproductivity.

The above-mentioned object can be attained by the aromatic polyimide double layered hollow filamentary membrane of the present invention which comprises;

(A) a hollow filamentary microporous inner layer consisting essentially of a first aromatic imide polymer and having a filamentary hollow formed along the longitudinal axis thereof; and (B) a tubular filamentary outer asymmetric layer consisting essentially of a second aromatic imide polymer, and having (a) a tubular filamentary microporous intermediate layer covering and united with the outside surface of the hollow filamentary microporous inner layer and (b) a thin dense outside surface layer covering and united with the tubular filamentary microporous intermediate layer.

The above-mentioned aromatic polyimide double layered hollow filamentary membrane is produced by the process of the present invention, which comprises the steps of:

(1) feeding a first spinning dope solution of a first aromatic imide polymer in a concentration of 5 to 35% by weight in an organic solvent to an inner annular extruding opening of a hollow filament-spinning nozzle;

(2) feeding a second spinning dope solution of a second aromatic imide polymer in a concentration of 1 to 25% by weight in an organic solvent to an outer annular extruding opening formed around and concentric to the inner annular extruding opening, the concentration of the first aromatic imide polymer in the first spinning dope solution being 0.5% to 10% by weight greater than the concentration of the second aromatic imide polymer in the second spinning dope solution;

(3) concurrently extruding the first and second spinning dope solutions through the inner and outer annular extruding openings, respectively, while concurrently drafting the extruded first and second hollow filamentary streams of the first and second spinning dope solutions to allow the first and second hollow filamentary streams to be concentrically united with each other as a double layered hollow filamentary stream; and (4) bringing the double layered hollow filamentary stream into contact with a coagulating liquid to solidify the double layered stream and to form an aromatic polyimide double layered hollow filamentary membrane.

Preferably, the first aromatic imide polymer in the hollow filamentary microporous inner layer is a polymerization-imidization product of a tetracarboxylic acid component consisting essentially of 70 to 100 molar % of at least one member selected from biphenyltetracarboxylic acid compounds and 0 to 30 molar % of at least one member selected from an aromatic tetracarboxylic acid compounds other than those mentioned above, with a diamine component consisting essentially of 50 to 100 molar % of at least one aromatic diamine having two or more aromatic cyclic structures and 0 to 50 molar % of at least one aromatic diamine other than the above-mentioned diamine.

Also, preferably the second aromatic imide polymer in the tubular filamentary outer layer is a polymerization-imidization product of a tetracarboxylic acid component consisting essentially of 70 to 100 molar % of at least one member selected from biphenyltetracarboxylic acid compounds and 0 to 30 molar % of at least one member selected from aromatic tetracarboxylic acid compounds other than those mentioned above, with a diamine component consisting essentially of 50 to 98 molar % of at least one aromatic diamine having at least one divalent radical of the formula: $-SO_2-$, 2 to 30 molar % of at least one aromatic diamine having at least one divalent radical of the formula: $-C(CF_3)_2-$, and 0 to 48 molar % of at least one aromatic diamine other than those mentioned above.

DESCRIPTION OF THE PREFERRED EMBODIMENTS

The aromatic polyimide double layered hollow filamentary membrane of the present invention comprises (A) a hollow filamentary microporous inner layer and (B) a tubular filamentary asymmetric outer layer consisting essentially of (a) a tubular filamentary microporous intermediate layer and (b) a thin filamentary dense outside surface layer.

Figure 1:
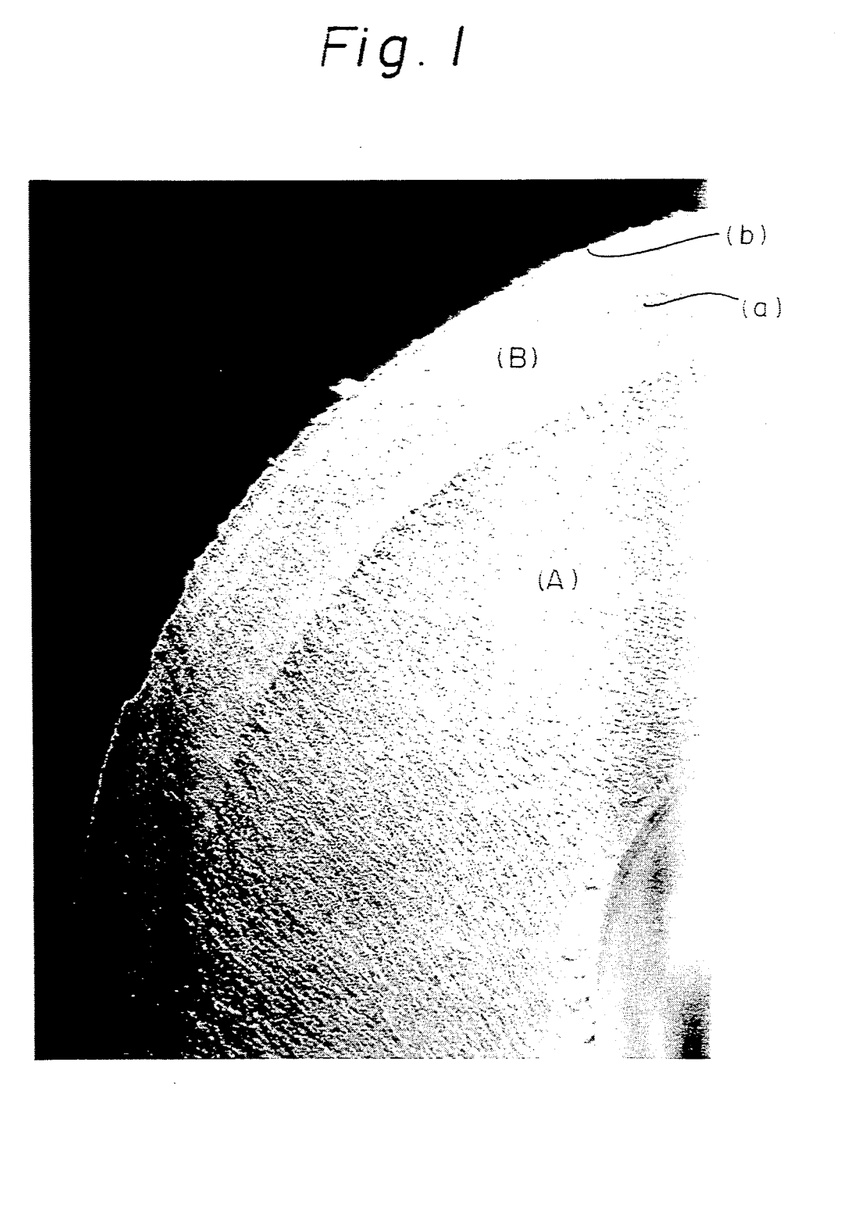
FIG. 1 is a microscopic photograph showing a portion of a cross-sectional profile of an embodiment of the aromatic polyimide double layered hollow filamentary membrane of the present invention; and, FIG. 2 is a plane view of a spinning nozzle for producing the aromatic polyimide double layered hollow filamentary membrane of the present invention.

Referring to FIG. 1, a central portion of the double layered hollow filamentary membrane is composed of the hollow filamentary microporous inner layer (A), and a tubular filamentary asymmetric outer layer (B) covers and is united with the inner layer (A). In the outer layer (B), a tubular filamentary microporous intermediate layer (a) directly covers and is united with the inner layer (A) and a thin dense outside surface layer (b) covers and is united with the intermediate layer (a).

The outside surface layer (b) has a dense structure, and preferably, has a thickness of from 0.01 to 1 μm. The intermediate layer (a) has a microporous structure, and preferably, has a thickness of 3 to 200 μm, more preferably 5 to 100 μm. The inner layer (A) has a microporous structure, and preferably, has a thickness of 10 to 500 μm, more preferably 20 to 300 μm.

In the hollow filamentary membrane of the present invention, the thickness ratio of the outer layer (B) to the inner layer (A) is preferably from 1:0.5 to 1:100, more preferably from 1:1 to 1:80.

Also, the average density of the inner layer (A) is larger than that of the outer layer (B). For example, the average porosity of the inner layer (A) is from 45 to 70% by volume, preferably from 50 to 65% by volume, and the average porosity of the outer layer (B) is from 55 to 75% by volume, preferably from 60 to 70% by volume, and is 2% to 10% higher than that of the inner layer (A).

Generally, the hollow filamentary membrane of the present invention has an outside diameter of 50 to 2000 μm, preferably 100 to 1500 μm, more preferably 150 to 1000 μm, and an inside diameter (diameter of the filamentary hollow) of 30 to 1500 μm, preferably 50 to 800 μm.

The aromatic imide polymers usable for forming the inner and outer layers of the hollow filamentary membrane of the present invention must be soluble in a particular organic solvent, the solution of the aromatic imide polymer in the organic solvent must be capable of forming a hollow filamentary membrane, and the hollow filamentary stream of the solution must be coagulatable by a coagulating liquid.

The aromatic imide polymers usable for the present invention consist essentially of at least one polymerization-imidization product of a tetracarboxylic acid component with a diamine component.

The tetracarboxylic acid component usable for the present invention comprises, 50 to 100 molar % of a principal ingredient consisting of at least one member selected from aromatic tetracarboxylic acids, and dianhydrides, esters and salts thereof and 0 to 50 molar % of an additional ingredient consisting of at least one member selected from the tetracarboxylic acids, dianhydrides, esters and salts thereof other than those in the principal ingredient.

The diamine component usable for the present invention comprises 50 to 100 molar % of a principal ingredient consisting of at least one aromatic diamine and 0 to 50 molar % of an additional ingredient consisting of at least one member selected from diamines other than those in the principal ingredient; for example, aliphatic diamines and cycloaliphatic diamines.

The aromatic imide polymer usable for the present invention preferably comprises at least 80% by weight of at least one solvent soluble wholly aromatic imide polymer, to provide a hollow filamentary membrane having an enhanced heat and chemical resistance.

The aromatic tetracarboxylic acid compounds usable for the tetracarboxylic acid component are preferably selected from biphenyltetracarboxylic acids, for example, 3,3',4,4'-biphenyltetracarboxylic acid and 2,3,3',4'-biphenyltetracarboxylic acid, benzophenonetetracarboxylic acids, for example, 3,3',4,4'-benzophenonetetracarboxylic acid, 2,3,3',4'-benzophenonetetracarboxylic acid, and dianhydrides, esters and salts of the above-mentioned acids.

Preferably, the tetracarboxylic acid component for the present invention comprises 50 to 100 molar %, more preferably 60 to 100 molar % of at least one biphenyltetracarboxylic acid, to provide an aromatic imide polymer having a high solubility in organic solvents, for example, phenol compounds and capable of forming a solution thereof having a high stability in the organic solvents and a thin membrane-forming property to form a hollow filamentary membrane having an excellent heat and chemical resistance.

The other tetracarboxylic acid usable for the first and second aromatic imide polymers is selected from aliphatic tetracarboxylic acids, for example, butane tetracarboxylic acid and cycloaliphatic tetracarboxylic acids, for example, 1,2,4-tricarboxy-3-carboxymethyl cyclopentane dianhydride.

The aromatic diamine usable for the principal ingredient of the diamine component can be selected from the following groups:

(1) Diaminodiphenylethers, for example, 4,4'-diaminodiphenylether, 3,4'-diaminodiphenylether, 3,3'-dimethyl-4,4'-diaminodiphenylether and 3,3'-dimethoxy-4,4'-diaminodiphenylether.

(2) Diaminodiphenylmethanes, for example, 4,4'-diaminodiphenylmethane, 3,3'-diaminodiphenylmethane, and 3,3'-dimethyl-4,4'-diaminodiphenylmethane.

(3) Diaminobibenzyls, for example, 3,3'-diaminobibenzyl and 4,4'-diamino-2,2'-dimethyldibenzyl.

(4) Diaminobenzophenones, for example, 4,4'-diaminobenzophenone and 3,3'-diaminobenzophenone.

(5) 2,2-bis(aminophenyl)propanes, for example, 2,2-bis(3-aminophenyl)propane and 2,2-bis[4-(4'-aminophenoxy)phenyl]propane.

(6) Benzidines, for example, 3,3'-dimethylbenzidines and 3,3'-dimethoxybenzidines.

(7) Diaminodiphenyl sulfides and sulfones, for example, 4,4'-diaminodiphenylsulfide, 3,3'-diaminodiphenylsulfide, 4,4'-diaminodiphenylsulfone and 3,3'-diaminodiphenylsulfone.

(8) Diaminodiphenylenesulfones, for example, 3,7-diamino-2,8-dimethyl-diphenylenesulfone, 3,7-diamino-4,8-dimethyl-diphenylenesulfone, 3,7-diamino-4,6-dimethyl-diphenylenesulfone, and 3,7-diamine-2,8-diethyl-diphenylenesulfone.

(9) The like, for example, 3,7-diaminothioxanthene-5,5-dioxide, bis[4-(4-aminophenoxy)phenyl]-sulfone, 4,4-bis(4-aminophenoxy)biphenyl, and 1,4-bis(4-aminophenoxy)benzene.

The aromatic diamine usable for the additional ingredient of the diamine component can be selected from, for example, o-, m- and p-phenylenediamines, 3,5-diaminobenzoic acid and 2,6-diaminopyridine.

Preferably, the first aromatic imide polymer in the inner layer is a polymerization-imidization product of a carboxylicacid component consisting essentially of 70 to 100 molar %, more preferably 80 to 100 molar %, most preferably, 90 to 100 molar %, of at least one member selected from biphenyltetracarboxylic acids and dianhydrides, esters and salts thereof and 0 to 30 molar % of at least one additional member selected from aromatic tetracarboxylic acids, and dianhydrides, esters and salts other than those mentioned above, with a diamine component consisting essentially of 50 to 100 molar %, more preferably, 60 to 100 molar %, still more preferably 70 to 100 molar %, of at least one aromatic diamine having two or more, preferably 2 to 5 aromatic cyclic structures, preferably benzene rings, and 0 to 50 molar %, more preferably 0 to 40 molar %, still more preferably 0 to 30 molar %, of at least one additional aromatic diamine different from that mentioned above.

Also, preferably the second aromatic imide polymer in the outer layer is a polymerization-imidization product of a tetracarboxylic component consisting essentially of 70 to 100 molar %, more preferably 80 to 100 molar %, most preferably 90 to 100 molar %, of at least one member selected from biphenyltetracarboxylic acid and dianhydrides, esters and salts thereof and 0 to 30 molar % of at least one additional member selected from tetracarboxylic acids, and dianhydrides, esters and salts thereof different from that mentioned above, with a diamine component consisting essentially of 50 to 98 molar %, more preferably 60 to 98 molar %, most preferably 70 to 98 molar %, of at least one aromatic diamine having at least one divalent radical of the formula: $-SO_2-$, 2 to 30 molar %, more preferably 3 to 25 molar %, most preferably 5 to 20 molar %, of at least one aromatic diamine having at least one divalent radical of the formula: $-C(CF_3)_2-$, and 0 to 48 molar %, more preferably 0 to 37 molar %, of at least one additional aromatic diamine different from those mentioned above.

If the content of the biphenyltetracarboxylic acid compound in the tetracarboxylic acid component in the first and second aromatic imide polymers is less than 70 molar %, the resultant polymer sometimes exhibits an unsatisfactory solubility in the organic solvents, and even if dissolved, the resultant solution is unstable and thus the polymer sometimes deposits from the solution and exhibits an unsatisfactory membrane-forming property.

If the content of the aromatic diamine having two or more aromatic cyclic structures in the diamine component in the first aromatic imide polymer is less than 50 molar %, the resultant first aromatic imide polymer sometimes exhibits an unsatisfactory solubility in the organic solvent.

If the content of the aromatic diamine having the radical —$SO_2$— in the diamine component in the second aromatic imide polymer is less than 50 molar %, and/or the content of the aromatic diamine having the radical —$C(CF_3)_2$— in the diamine component in the second aromatic imide polymer is less than 2 molar %, the resultant outer layer sometimes causes the resultant hollow filamentary membrane to exhibit an unsatisfactory gas-permeability for hydrogen gas and carbon dioxide gas.

The biphenyltetracarboxylic acid compound for the first and second aromatic imide polymers in the inner and outer layers is preferably selected from 3,3',4,4'-biphenyltetracarboxylic acid and 2,3,3',4'-biphenyltetracarboxylic acid, and dianhydrides, esters and salts of the above-mentioned acids.

The additional aromatic tetracarboxylic acid compound usable for first and second aromatic imide polymers is preferably selected from pyromellitic acid, benzophenonetetracarboxylic acids, biphenylethertetracarboxylic acids, and dianhydrides, esters and salts of the above-mentioned acids.

The aromatic diamine having two or more aromatic cyclic structures usable for the first aromatic imide polymer in the inner layer is preferably selected from diaminodiphenylethers, diaminodiphenylmethanes, 2,2-bis-(aminophenyl)propanes, 2,2-bis(aminophenoxyphenyl)propanes, diaminobiphenyles, diaminodiphenylsulfones, bis(aminophenoxyphenyl)sulfones, diaminodiphenylenesulfones, diaminothioxanthenes and derivatives thereof, 2,2-bis(aminophenyl)hexafluoropropanes, and 2,2-bis-(aminophenoxyphenyl)hexafluoropropanes.

The additional aromatic diamine usable for the first aromatic imide polymer is preferably selected from o, m and p-phenylenediamines, 3,5-diaminobenzoic acid, and 2,6-diaminopyridine.

The aromatic diamine having at least one divalent radical of the formula: —$SO_2$— and usable for the second aromatic imide polymer in the outer layer is preferably selected from diaminodiphenylsulfones, for example, 4,4'-diamino-diphenylsulfone, 4,4'-diamino-3,3'-dimethyl-diphenylsulfone, 3,3'-diamino-diphenylsulfone and 3,4'-diaminodiphenylsulfone; bis(aminophenoxyphenyl)sulfones, for example, bis[4-(4'-aminophenoxy)-phenyl]sulfone and bis[4-(3'-aminophenoxy)-phenyl]sulfone; diaminodiphenylenesulfones, for example, 3,7-diamino-2,8-dimethyl-diphenylenesulfone, 3,7-diamino-2,8-diethyl-diphenylenesulfone, 3,7-diamino-2,8-dipropyl-diphenylenesulfone, 2,8-diamino-3,7-dimethyl-diphenylenesulfone, and 3,7-diamino-2,8-dimethoxy-diphenylenesulfone; and diamino-thioxanthenes, for example, 3,7-diamino-thioxanthene-5,5-dioxide and 2,8-diamino-thioxanthene-5,5-dioxide.

The aromatic diamine having at least one divalent radical of the formula —$C(CF_3)_2$—, usable for the second aromatic imide polymer in the outer layer is preferably selected from those having at least one aromatic ring, for example, benzene ring, bonded to the divalent radical —$C(CF_3)_2$—, for example, 2,2-bis(aminophenyl)-hexafluoropropane, for example, 2,2-bis(4-aminophenyl)hexafluoropropane, 2,2-bis(3-aminophenyl)hexafluoropropane, 2,2-bis(4-amino-3-methylphenyl)hexafluoropropane, and 2,2-bis(3-amino-4-methylphenyl)hexafluoropropane; and 2,2-bis(aminophenoxyphenyl)hexafluoropropanes, for example, 2,2-bis[4-(4-aminophenoxy)phenyl]hexafluoropropane and 2,2-bis[4-(3-aminophenoxy)-phenyl]hexafluoropropane.

The additional diamine usable for the second aromatic imide polymer in the outer layer is preferably selected from diaminodiphenylethers, for example, 4,4'-diaminodiphenylether, 3,3'-dimethyl-4,4'-diaminodiphenylether, 3,3'-diethoxy-4,4'-diaminodiphenylether and 3,3'-diaminodiphenylether; diaminodiphenylmethanes, for example, 4,4'-diaminodiphenylmethane and 3,3'-diaminodiphenylmethane; 2,2-bis(aminophenyl)-propanes, for example, 2,2-bis(3-aminophenyl)propane and 2,2-bis(4-aminophenyl)propane; 2,2'-bis(aminophenoxyphenyl)-propanes, for example, 2,2-bis[4-(4'-aminophenoxy)-phenyl]propane, and 2,2-bis[4-(3'-aminophenoxy)phenyl]-propane; diaminobenzophenones, for example, 4,4,-diaminobenzophenone and 3,3'-diaminobenzophenone; and the other diamines, for example, o-, m-, and p-phenylenediamines, 3,5-diaminobenzoic acid, and 2,6-diaminopyridine.

The first aromatic imide polymer in the inner layer preferably has a logarithmic viscosity of from 0.07 to 7, more preferably, 0.2 to 5, measured at a concentration of 0.5 g/100 ml in a solvent consisting of 4 parts by volume of p-chlorophenol and 1 part by volume of o-chlorophenol at a temperature of 30° C.

Also, the second aromatic imide polymer in the outer layer preferably has a logarithmic viscosity of 0.1 to 7, more preferably, 0.2 to 5, measured under the same conditions as mentioned above.

The hollow filamentary membrane of the present invention can be produced from two different spinning dope solutions which contain aromatic imide polymers soluble in an organic solvent and have at least a different concentration of the polymer, by using a double-layered hollow filament-spinning nozzle. The nozzle has an inner annular extruding opening and an outer annular extruding opening formed concentrically with and about the inner annular extruding opening.

Figure 2:
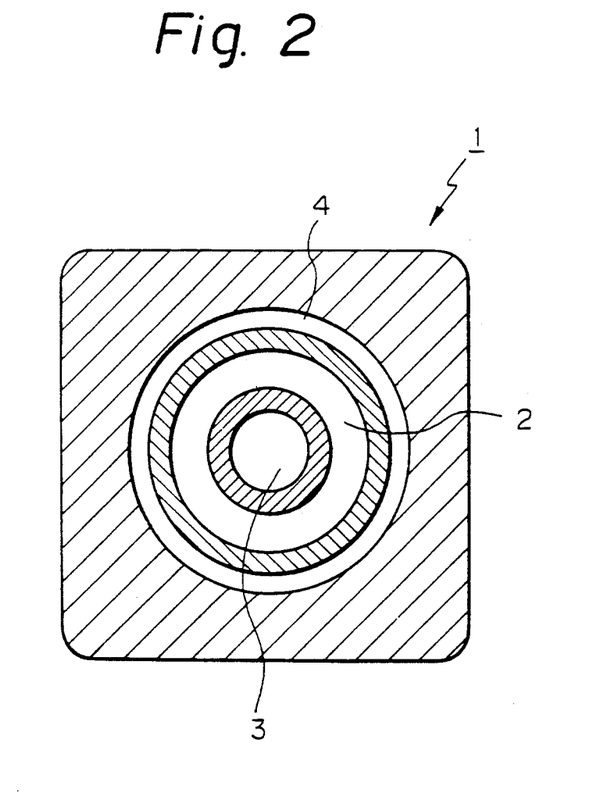

Referring to FIG. 2, a double layered hollow filament spinning nozzle 1 has a inner annular extruding opening 2, a center hollow 3 formed in the center portion of the inner annular opening 2 and an outer annular extruding opening 4. The center hollow 3 is used to blow a core gas consisting of air or nitrogen gas therethrough to control the diameter of the hollow to be formed in the inner layer.

In the process of the present invention, a first spinning dope solution of a first aromatic imide polymer in a concentration of 5 to 35% by weight, preferably 6 to 30% by weight, in an organic solvent is fed to an inner annular extruding opening of a hollow filament-spinning nozzle. Also, a second spinning dope solution of a second aromatic imide polymer in a concentration of 1 to 25% by weight, preferably 1.2% to 23% by weight, more preferably 1.5% to 22% by weight, in an organic solvent is fed to an outer annular extruding opening in the spinning nozzle. The concentration of the first aromatic imide polymer in the first spinning dope solution must be 0.5% to 10% by weight, preferably 1% to 8% by weight, higher than the concentration of the second aromatic imide polymer in the second spinning dope solution. The above-mentioned concentration features are important to ensure a proper control of the average densities or porosities of the inner layer and the outer layer to the specific values as mentioned hereinbefore.

The first and second spinning dope solutions are respectively, concurrently extruded through the inner and outer annular extruding opening of the spinning nozzle, and the extruded first and second hollow filamentary streams of the first and second spinning dope solutions are drafted to allow the first and second hollow filamentary streams to be concentrically united with each other to form a double layered hollow filamentary stream.

The double layered hollow filamentary stream is brought into contact with a coagulating liquid and converted to a solidified aromatic polyimide double layered hollow filamentary membrane.

In the preparation of the first or second spinning dope solution, the first or second aromatic imide polymer is evenly dissolved in the above-mentioned specific concentration in a polar organic solvent which must be capable of dissolving the polymer and compatible with the coagulating liquid, and preferably has a melting point of 200° C. or less, more preferably 150° C. or less.

The polar organic solvent usable for the process of present invention consists essentially of at least one member selected from halogenated phenol compounds, for example, 3-chlorophenol, 4-chlorophenol (or p-chlorophenol, PCP), 4-bromophenol, 2-chloro-5-hydroxytoluene; phenol compounds, for example, phenol, cresol and xylenol; amide type polar solvents, for example, N-methyl-2-pyrrolidone, N,N-dimethylformamide, N,N-dimethylacetamide and dimethylsulfoxide; and cyclic ether type solvents, for example, dioxane.

The organic solvent in the first and second spinning dope solutions may be the same as that used for the polymerization of the first and second aromatic imide polymers.

The organic solvent may contain a particular amount of at least one poor solvent, for example, benzene, xylene and toluene, for the aromatic imide polymers.

The second spinning dope solution for forming the outer layer preferably has a rotation viscosity of about 1 to 20,000 poises, more preferably 5 to 10,000 poises, most preferably 10 to 8,000 poises at the extruding temperature used, i.e., from about 20° C. to 150° C.

Also, the first spinning dope solution for forming the inner layer preferably has a rotation viscosity of 1.01 to 10 times, more preferably, 1.05 to 5 times, that of the second spinning dope solution at a temperature of 100° C.

The first and second spinning dope solutions are separately fed to the inner and outer annular extruding openings at a temperature of preferably about 20° C. to 150° C., more preferably 30° C. to 120° C, under a proper back pressure.

The concurrently extruded hollow filamentary streams of the first and second spinning dope solution are drafted and concentrically united to form a double layered hollow filamentary stream.

In the concurrent extruding step, a ratio of the extruding rate of the second spinning dope solution to the first spinning dope solution is preferably from 1:60 to 1:1.5, preferably 1:40 to 1:2. This specific extruding rate ratio is effective for stabilizing the concurrent extruding procedures.

Also, preferably the ratio in width of the outer annular extruding opening to the inner annular extruding opening is from 5:1 to 1:10, more preferably from 1:1 to 1:5.

The resultant double layered hollow filamentary stream of the first and second aromatic imide polymers are coagulated at a temperature of preferably from −10° C. to 60° C., more preferably from −5° C. to 4° C., in a coagulating liquid.

The coagulating liquid consists essentially of at least one liquid which is not capable of dissolving the first and second aromatic imide polymers and compatible with the polar organic solvent in which the first and second aromatic imide polymers are dissolved. The coagulating liquid preferably consists essentially of at least one member selected from water; lower aliphatic alcohols, for example, methyl alcohol, ethyl alcohol, n-propyl alcohol and isopropyl alcohol; and lower aliphatic ketones, for example, acetone, methylethyl ketone, diethyl ketone and ethylpropyl ketone.

The coagulating liquid may contain, as an additional component, a small amount of at least one polar organic solvent capable of dissolving the aromatic imide polymers, to control the coagulating rate of the spinning dope solution stream. For example, a coagulating liquid consists of 70 to 90% by volume of water and 10 to 30% by volume of N,N-dimethylformamide.

In the coagulating step, the double layered hollow filamentary stream is introduced into the coagulating liquid, and then the surface-coagulated double layered hollow filamentary stream of the first and second aromatic imide polymers is led around a pair of guide roller located in the coagulating liquid two or more times and completely coagulated. The coagulated double layered hollow filamentary membrane is preferably taken up at a speed of about 2 to 80 m/min from the coagulating liquid.

The coagulated double layered hollow filamentary membrane is then treated with an aliphatic hydrocarbon treating liquid comprising at least one member of, for example, isopentane, n-hexane, isooctane and n-heptane, to completely replace the residual coagulating liquid in the membrane by the hydrocarbon liquid.

The hydrocarbon liquid-containing hollow filamentary membrane is dried to evaporate away the hydrocarbon liquid.

The resultant hollow filamentary membrane is preferably heat-treated at a temperature lower than the softening temperatures or second order transition points of the first and second aromatic imide polymers.

The present invention will be further illustrated by the following examples.

REFERENTIAL EXAMPLE 1

Preparation of Spinning Dope Solutions A to F

1. Spinning dope solution A

To a mixture of 99 m moles of 3,3'4,4'-biphenyltetracarboxylic dianhydride, 60 m moles of 4,4'-diaminodiphenylether, 30 m moles of 3,5-diaminobenzoic acid, and 10 m moles of 4,4'-diaminodiphenylmethane was added 253 g of p-chlorophenol, and the admixture was charged in a separable flask with a stirrer and a conduit for feeding nitrogen gas therein. The reaction admixture was subjected to polymerization-imidization at a temperature of 180° C. for 10 hours while feeding nitrogen gas into the flask and stirring the reaction admixture.

The obtained spinning dope solution A had a concentration of the resultant aromatic imide polymer of 15% by weight and exhibited a rotation viscosities of 1010 poises at a temperature of 100° C. and of 3550 poises at a temperature of 70° C.

2. Spinning dope solution B

The same procedures as those for the above-mentioned solution B were carried out except that the 3,3′,4,4′-biphenyltetracarboxylic dianhydride and p-chlorophenol were used in amounts of 98 m moles and 202 g, respectively, and the polymerization-imidization was carried out for 6 hours.

The obtained spinning dope solution B had a concentration of the resultant aromatic imide polymer of 18% by weight, and exhibited a rotation viscosity of 1300 poises at 100° C. and of 5000 poises at 70° C.

3. Spinning dope solution C

The same procedures as mentioned for the solution A were carried out except that the reaction admixture consisted of 99 m moles of 3,3′,4,4′-biphenyltetracarboxylic dianhydride, 90 m moles of diaminodimethyl-diphenylenesulfone, 10 m moles of 4,4′-diaminodiphenylether, and 293 g of p-chlorophenol.

The obtained spinning dope solution C had a concentration of the resultant aromatic imide polymers of 15% by weight and exhibited rotation viscosities of 950 poises at 100° C. and of 2800 poises at 70° C.

4. Spinning dope solution D

The same procedures as mentioned for the solution A were carried out except that the 3,3′,4,4′-biphenyltetracarboxylic dianhydride and p-chlorophenol were used in amounts of 96 m moles and 179 g respectively and the polymerization-imidization procedure was carried out for 11 hours.

The obtained spinning dope solution D had a concentration of the resultant aromatic imide polymer of 20% by weight and exhibited rotation viscosities of 1240 poises at 100° C. and 4800 poises at 70° C.

5. Spinning dope solution E

The same procedures as mentioned for the solution C were carried out except that the 3,3′4,4′-biphenyltetracarboxylic dianhydride and p-chlorophenol were used in amounts of 97 m mole and 205 g, respectively and the polymerization-imidization procedure was carried out for 6 hours.

The obtained spinning dope solution E had a concentration of the resultant aromatic imide polymer of 20% by weight and exhibited rotation viscosities of 1050 poises at 100° C. and 4500 poises at 70° C.

6. Spinning dope solution F

The same procedures as mentioned for the solution C were carried out except that the 3,3′,4,4′-biphenyltetracarboxylic dianhydride and p-chlorophenol were used in amounts of 99 m moles and 465 g, respectively and the polymerization-imidization procedure was carried out for 17 hours.

The obtained spinning dope solution F had a concentration of the aromatic imide polymer of 10% by weight and exhibited solution viscosities of 900 poises at 100° C. and 2300 poises at 70° C.

All the spinning dope solutions A to F were filtered through a stainless steel filtering screen having a 400 mesh size, before use.

EXAMPLES 1 TO 6

In each of Examples 1 to 6, a double layered hollow filament-spinning nozzle having the following dimensions was used. (Referring to FIG. 2).

| Outer annular extruding opening 4 | |
|---|---|
| Outside diameter: | 1600 $\mu$m |
| Width: | 100 $\mu$m |
| Inner annular extruding opening 2 | |
| Outside diameter: | 1200 $\mu$m. |
| Width: | 300 $\mu$m |
| Central opening 3 Diameter: | 400 $\mu$m |

The spinning dope solutions as indicated in Table 1 were extruded through the outer and inner openings, the resultant hollow-filamentary stream was fed through a nitrogen atmosphere, and then coagulated in a coagulating bath consisting of 65 parts by weight of ethyl alcohol and 35 parts by weight of water at a temperature of 0° C. by feeding the stream around a pair of guide rollers, and the resultant coagulated hollow filamentary membrane was taken up from the coagulating both at a speed of 15 m/min.

The resultant hollow filamentary membrane was wound up on a bobbin and washed with ethyl alcohol to completely remove the coagulating liquid from the membrane, the ethyl alcohol in the membrane was replaced by n-hexane, and the membrane was then dried by evaporating n-hexane at a temperature of 50° C., and finally, heat treated at the temperature indicated in Table 1 for 30 minutes.

The resultant dried, heat-treated double layered hollow filamentary membrane had an outside diameter of about 400 $\mu$m and a inside diameter of about 250 $\mu$m.

An element for measuring the gas-permeability of the hollow filamentary membrane and an element for measuring the pressure resistance thereof were prepared from stainless steel pipes, the membrane, and an adhesive agent.

The gas-permeability was measured by fixing the gas-permeability measurement element in a stainless steel container, a mixture of 52 parts by volume of hydrogen gas and 48 parts by volume of methane gas was caused to flow through the container under a pressure of 10 kg/cm$^2$ and a temperature of 50° C.

The permeabilities of the hydrogen and methane gases (PH$_2$ and PCH$_4$) and a ratio (PH$_2$/PCH$_4$) in permeability of hydrogen gas to methane gas were calculated from the results of gas-chromatography analysis. The ratio PH$_2$/PCH$_4$ corresponds to the gas-separating property of the membrane.

The pressure resistance was measured by fixing the pressure resistance-measurement element in a stainless steel container in such a manner that both the hollow ends of the hollow filamentary membrane in the measurement element were open, causing nitrogen gas to flow through the hollow of the hollow filamentary membrane, introducing a fluid paraffin under pressure into a space between the inside wall of the container and the outer surface of the hollow filamentary membrane, and continuously measuring the flow rate of the nitrogen gas.

The maximum pressure resistance of the hollow filamentary membrane was calculated from the relationship between the fluid paraffin-introducing pressure and the change in the flow rate of nitrogen gas through the hollow filamentary membrane.

The results are shown in Table 1.

COMPARATIVE EXAMPLES 1 TO 3

In each of Comparative Examples 1 to 3, a single layer hollow filament-spinning nozzle had the following dimensions.

Outside diameter of single annular opening:

| Outside diameter of single annular opening: | 1200 μm |
|---|---|
| Width of annular opening: | 300 μm |
| Diameter of central hollow: | 400 μm |

The spinning dope solution of the type indicated in Table 1 was extruded through the single layer hollow filament-spinning nozzle and coagulated and treated in the same manner as in Example 1, and a single layer hollow filamentary membrane was obtained.

The hollow filamentary membrane of Comparative Example 3 had a cross-sectional profile which was out of round.

The measurement results are shown in Table 1.

COMPARATIVE EXAMPLE 4

The same procedures as in Example 6 were carried out except that the spinning dope solution E was extruded through the outer annular opening and the spinning dope solution F was extruded through the inner annular opening.

The cross-sectional profile of the resultant hollow filament membrane was out of round.

The measurement results are shown in Table 1.

In Comparative Examples 2 and 3, the resultant single layer hollow filamentary membranes exhibited a poor pressure resistance, whereas in Examples 3 and 6, the resultant hollow filamentary membranes exhibited an excellent pressure resistance.

In view of Example 6 and Comparative Example 4, it is clear that the spinning dope solution for forming the inner layer must have a higher polymer concentration than that for the outer layer.

In Example 4, the resultant membrane exhibited the hydrogen gas permeabilities and ratios ($PH_2/PCH_4$) ($H_2$—$CH_4$ separating property) at temperatures of 80° C., 120° C., and 150° C. as shown in Table 2.

TABLE 2

| | (Example 4) | |
|---|---|---|
| Temperature (°C.) | Hydrogen gas-permeability ($cm^3/cm^2 \cdot sec \cdot cmHg$) | Gas-permeability ratio ($PH_2/PC_4$) |
| 80 | $32 \times 10^{-5}$ | 76 |
| 120 | $49 \times 10^{-5}$ | 48 |
| 150 | $64 \times 10^{-5}$ | 36 |

Also, the composite membrane of Example 4 exhibited a helium gas permeability of $25.1 \times 10^{-5}$ $cm^3/cm^2.sec.cmHg$ at a temperature of 80° C. and at a presence of 150 $kg/cm^2$.

After flowing helium gas for 3000 hours through the membrane of Example 4, the helium gas-permeability of the membrane was $22.5 \times 10^{-5}$ $cm^3/cm^2.sec.cmHg$ at the above-mentioned temperature and pressure, and thus the retention of the helium gas-permeability was

TABLE 1

| | Preparation of hollow filamentary membrane | | | Properties of hollow filamentary membrane | | |
|---|---|---|---|---|---|---|
| Example No. | Type of spinning dope solution | | Temperature of heat treatment (°C.) | Pressure resistance ($kg/cm^2$) | Hydrogen gas permeability $P_{H_2}$ at 50° C. ($\times 10^{-5}$ $cm^3/cm^2 \cdot sec \cdot cmHg$) | Gas permeability ratio at 50° C. $PH_2/PCH_4$ |
| | Outer layer | Inner layer | | | | |
| Example 1 | A | B | 280 | 110 | 6 | 218 |
| Comparative Example 1 | A | — | 280 | 60 | 7 | 220 |
| Example 2 | A | D | 280 | 150 | 7 | 221 |
| Example 3 | C | D | 300 | 150 | 26 | 111 |
| Comparative Example 2 | C | — | 300 | 80 | 27 | 107 |
| Example 4 | C | E | 300 | 200 | 21 | 110 |
| Example 5 | C | E | 350 | 300< | 15 | 120 |
| Example 6 | F | E | 350 | 200 | 25 | 100 |
| Comparative Example 3 | F | — | 300 | 30 | 26 | 90 |
| Comparative Example 4 | E | F | 300 | 60 | 2 | 150 |

In Comparative Example 1, the resultant single layer hollow filamentary membrane exhibited a high permeability ratio ($PH_2/PCH_4$) but exhibited a poor pressure resistance, whereas the double layered hollow filamentary membrane of Example 1 exhibited not only a high permeability ratio ($PH_2/PCH_4$) but also an excellent pressure resistance.

In the double layered hollow filamentary membrane of Example 1, the inner layer had an average porosity of 61% and the outer layer had an average porosity of 67%.

In Example 2, the resultant hollow filamentary membrane consisting of two different types of aromatic imide polymers exhibited a high permeability ratio $PH_2/PCH_4$ and an excellent pressure resistance.

$22.5/25.1 \times 100 = 90\%$.

Also, after flowing helium gas for 10,000 hours, the helium gas-permeability of the membrane was $22.2 \times 10^{-5}$ $cm^3/cm^2.sec.cmHg$, and thus the retention of the helium gas permeability was $22.2/25.1 \times 100 = 88\%$.

Tables 1 and 2 clearly show that the double layered hollow-filamentary membranes of the present invention exhibit a satisfactory pressure resistance of 100 $kg/cm^2$ or more, particularly 150 $kg/cm^2$ or more due to the presence of the inner porous layer and a satisfactory gas permeability and gas separating property because the outer layer had a dense outside surface layer and a porous intermediate layer.

Also, it was confirmed that the inner hollow filamentary stream of the first aromatic imide polymer can be concentrically, firmly united to the outer hollow filamentary stream of the second aromatic imide polymer due to the Barus effect of the extruded polymer solution streams and the diffusion effect of the organic solvent in the streams during the extruding and drafting procedures to form a united hollow filamentary membrane.

Further, the resultant aromatic imide polymer in the spinning dope solution N had a logarithmic viscosity of 1.0 measured in the same manner mentioned above.

TABLE 3

| Type of spinning dope solution | Polymerization component | | | | Concentration of polymer in solution (% by wt.) | Rotation viscosity of solution at 100° C. (poise) |
|---|---|---|---|---|---|---|
| | Tetracarboxylic dianhydride | | Diamine | | | |
| | Type | Amount (m mole) | Type | Amount (m mole) | | |
| G | s-BPDA | 99 | TSN | 100 | 15 | 1302 |
| H | s-BPDA | 99 | TSN | 90 | 15 | 1190 |
| | | | DADE | 10 | | |
| I | s-BPDA | 99 | TSN | 30 | 15 | 855 |
| | | | HFIP | 70 | | |
| J | s-BPDA | 99 | TSN | 95 | 15 | 1228 |
| | | | HFIP | 5 | | |
| K | s-BPDA | 99 | TSN | 90 | 15 | 1042 |
| | | | HFIP | 10 | | |
| L | s-BPDA | 99 | TSN | 90 | 15 | 1097 |
| | | | HFIP | 10 | | |
| M | s-BPDA | 99 | TSN | 80 | 15 | 911 |
| | | | HFPP | 20 | | |
| N | s-BAPA | 98 | TSN | 70 | 17 | 2306 |
| | | | DABA | 30 | | |

Note:
S-BPDA: 3,3',4,4'-biphenyltetracarboxylic dianhydride
TSN: 3,7-diamino-dimethyldiphenylene sulfone
DADE: 4,4'-diaminodiphenylether
DABA: 3,5-diaminobenzoic acid
HFIP: 2,2-bis(4-aminophenyl)hexafluoropropane
HFPP: 2,2-bis[4-(4-aminophenoxy)phenyl]hexafluoropropane

REFERENTIAL EXAMPLE 2

Preparation of Spinning Dope Solutions G to N

1. Spinning dope solution G

A reaction admixture of 99 m moles of 3,3',4,4'-biphenyltetracarboxylic dianhydride and 100 m moles of 3,7-diamino-dimethyl diphenylene-sulfone with 302 g of p-chlorophenol was charged in a separable flask with a stirrer and a nitrogen gas-introduction conduit and subjected to polymerization-imidization at a temperature of 180° C. for 16 hours while introducing nitrogen gas into the flask and stirring the reaction admixture.

The resultant spinning dope solution G had a concentration of the resultant aromatic imide polymer of 15% by weight and rotation viscosities of 1004 poises at 100° C. and 1432 poises at 90° C.

The resultant aromatic imide polymer exhibited a logarithmic viscosity of 1.1 measured at a concentration of 0.5 g/100 ml in a solvent consisting of 4 parts by volume of p-chlorophenol and 1 part by volume of o-chlorophenol at a temperature of 30° C.

2. Spinning dope solutions H, I, J, K, L, M and N

In the preparation of each of the spinning dope solutions H to N, the same procedures as those for the solution G were carried out except that the carboxylic acid component and the diamine component consisted of the types and amounts of the compounds indicated in Table 3 and the resultant solutions had the polymer concentration and the rotation viscosity at 100° C. as indicated in Table 3. Also, the resultant aromatic imide polymers in the spinning dope solutions H to M had a logarithmic viscosity of 1.1 measured in the same manner as mentioned above.

COMPARATIVE EXAMPLES 5 TO 7

In each of Comparative Examples 5 to 7, a double layered hollow filament-spinning nozzle having the following dimensions was used.

| Outer annular opening | |
|---|---|
| Outside diameter: | 1700 μm |
| Width: | 150 μm |
| Inner annular opening | |
| Outside diameter: | 1200 μm |
| Width: | 300 μm |
| Central hollow Diameter: | 400 μm |

Two spinning dope solutions of the types indicated in Table 4 were concurrently extruded through the spinning nozzle, the extruded two layered hollow filamentary stream of the solutions was introduced through a nitrogen gas atmosphere into a coagulating has consisting of a mixture of 65 parts by weight of ethyl alcohol and 35 parts by weight of water at a temperature of 0° C. and fed around a pair of guide roller, and then the completely coagulated hollow filamentary membrane was taken up from the coagulating bath at a speed of 15 m/min.

The coagulated hollow filamentary membrane was wound up on a bobbin, washed with ethyl alcohol to remove the coagulating liquid from the membrane, treated with n-hexane to replace the ethyl alcohol in the membrane thereby, dried by evaporating n-hexane from the membrane, and finally heat-treated at a temperature of 300° C. for 30 minutes.

The resultant double layered hollow filamentary membrane had the dimensions as shown in Table 3 and gas-permeating and separating properties as indicated in Table 3. The gas-permeating and separating properties were measured in the same manner as mentioned above. The measurement results are shown in Table 4.

EXAMPLES 7 TO 10

In each of Examples 7 to 10, the same procedures as those described in Comparative Example 1 were carried out except that the spinning dope solutions of the types indicated in Table 3 were used.

The dimensions and the gas-permeating and separating properties of the resultant hollow filamentary membrane are shown in Table 4.

TABLE 4

| | Type of spinning dope solution | | Dimension of hollow filamentary membrane | | Gas-permeability ($cm^3/cm^2 \cdot sec \cdot cmHg$) at 50° C. | | | Gas-permeability ratio | | |
|---|---|---|---|---|---|---|---|---|---|---|
| Example No. | Outer layer | Inner layer | Outside diameter ($\mu m$) | Inside diameter ($\mu m$) | $P\,H_2$ ($\times 10^{-5}$) | $P\,CO_2$ ($\times 10^{-5}$) | $P\,O_2$ ($\times 10^{-5}$) | $\dfrac{P\,H_2}{P\,CH_4}$ | $\dfrac{P\,CO_2}{P\,CH_4}$ | $\dfrac{P\,O_2}{P\,N_2}$ |
| Comparative Example 5 | G | N | 398 | 244 | 28 | 6.5 | 0.81 | 103 | 24 | 4.4 |
| Comparative Example 6 | H | N | 407 | 251 | 30 | 7.6 | 1.12 | 98 | 25 | 4.9 |
| Comparative Example 7 | I | N | 405 | 250 | 19 | 5.3 | 0.65 | 87 | 24 | 4.8 |
| Example 7 | J | N | 409 | 246 | 38 | 11.5 | 2.8 | 95 | 29 | 4.8 |
| Example 8 | K | N | 415 | 249 | 39 | 12.4 | 3.0 | 96 | 31 | 4.9 |
| Example 9 | L | N | 418 | 253 | 37 | 11.2 | 2.8 | 85 | 26 | 4.8 |
| Example 10 | M | N | 411 | 248 | 36 | 10.7 | 2.6 | 81 | 24 | 4.9 |

In the resultant hollow filamentary membrane of Example 7, the average porosity of the inner layer was about 58% and the average porosity of the outer layer was 65%.

In Example 8, the resultant hollow filamentary membrane exhibited a maximum pressure resistance of 130 kg/cm$^2$ calculated in the afore-mentioned manner.

It was confirmed that the resultant membranes of Examples 7, 9 and 10 had a similar pressure resistance to that of Example 8.

Also, the membrane of Example 8 exhibited the hydrogen gas permeabilities and ratios (PH$_2$/PCH$_4$) (H$_2$—CH$_4$ separating property) measured in the afore-mentioned manner at temperature of 80° C., 120° C., and 150° C. as indicated in Table 5.

TABLE 5

(Example 8)

| Temperature (°C.) | Hydrogen gas-permeability ($cm^3/cm^2 \cdot sec \cdot cmHg$) | Gas-permeability ratio (PH$_2$/PCH$_4$) |
|---|---|---|
| 80 | 58 × 10$^{-5}$ | 63 |
| 120 | 90 × 10$^{-5}$ | 41 |
| 150 | 120 × 10$^{-5}$ | 30 |

Tables 4 and 5 clearly indicate that the double layered hollow filamentary composite membranes of the present invention exhibit not only a satisfactory gas (H$_2$, CO$_2$, O$_2$)-permeability and gas-separating property, due to the outer layer but also an excellent pressure resistance due to the inner layer, and are useful as gas-separating membranes.

COMPARATIVE EXAMPLE 8

The same procedures as those in Comparative Example 5 were carried out except that the spinning dope solution H was extruded through a single layer hollow filament-spinning nozzle having a single annular extending opening having an outside diameter of 1200 μm, a width of the annular opening of 300 μm, and a diameter of the central hollow of 400 μm, and solidified in the same manner as in Comparative Example 1.

The resultant single layer hollow filamentary membrane had an outside diameter of 405 μm and a thickness of the membrane of 75 μm, and exhibited a poor maximum pressure resistance of 80 kg/cm$^2$.

We claim:

1. An aromatic polyimide double layered hollow filamentary membrane comprising:

(A) a hollow filamentary microporous inner layer consisting essentially of a first aromatic imide polymer soluble in organic solvents provided with a filamentary hollow formed along the longitudinal axis thereof and having a thickness of 10 to 500 μm; and (B) a tubular filamentary asymmetric outer layer consisting essentially of a second aromatic imide polymer soluble in organic solvents and having (a) a tubular filamentary microporous intermediate layer covering and united to the outside surface of the hollow filamentary microporous inner layer and having a thickness of 2 to 200 μm, and (b) a dense outside surface layer covering and united with the tubular filamentary microporous intermediate layer and having a thickness of no more than 1 μm.

2. The hollow filamentary membrane as claimed in claim 1, wherein the outside surface layer has a thickness of 0.01 to 1 μm.

3. The hollow filamentary membrane as claimed in claim 1, wherein a ratio in thickness of the outer layer to the inner layer is from 1:0.5 to 1:100.

4. The hollow filamentary membrane as claimed in claim 1, which has an outside diameter of 50 to 2000 μm and an inside diameter of 30 to 150 μm.

5. The hollow filamentary membrane as claimed in claim 1, wherein the first aromatic imide polymer in the inner layer is a polymerization-imidization product of a tetracarboxylic acid component consisting essentially of 70 to 100 molar % of at least one member selected from biphenyltetracarboxylic acids, and dianhydrides, esters and salts thereof and 0 to 30 molar % of at least one member selected from aromatic tetracarboxylic acids, and dianhydrides, esters and salts other than those mentioned above, with a diamine component consisting essentially of 50 to 100 molar % of at least one aromatic diamine having two or more aromatic cyclic structures and 0 to 50 molar % of at least one other aromatic diamine than the above-mentioned diamine.

6. The hollow filamentary membrane as claimed in claim 1, wherein the second aromatic imide polymer in the outer layer is a polymerization-imidization product of a tetracarboxylic acid component consisting essentially of 70 to 100 molar % of at least one member selected from biphenyltetracarboxylic acid and dianhydrides, esters and salts thereof and 0 to 30 molar % of at least one member selected from aromatic tetracarboxylic acids, and dianhydrides, esters and salts other than those mentioned above, with a diamine component consisting essentially of 50 to 98 molar % of at least one aromatic diamine having at least one divalent radical of the formula: $-SO_2-$, 2 to 30 molar % of at least one aromatic diamine having at least one divalent radical of the formula: $-C(CF_3)_2-$, and 0 to 48 molar % of at least one aromatic diamine other than those mentioned above.

7. The hollow filamentary membrane as claimed in claim 5 or 6, wherein the biphenyltetracarboxylic acid is selected from 3,3',4,4'-biphenyltetracarboxylic acid and 2,3,3',4',-biphenyltetracarboxylic acid.

8. The hollow filamentary membrane as claimed in claim 5, wherein the aromatic diamine having two or more aromatic cyclic structures is selected from the group consisting of diaminodiphenyl ethers, diaminodiphenylmethanes, 2,2-bis(aminophenyl) propanes, diaminodiphenyls, diaminodiphenylsulfones, bis(aminophenoxyphenyl) sulfones, diaminodipheylenesulfones, diaminothioxanthenes, 2,2-bis(aminophenyl) hexafluoropropanes and 2,2-bis-(aminophenoxyphenyl) hexafluoropropanes.

9. The hollow filamentary membrane as claimed in claim 6, wherein the aromatic diamine having at least one divalent radical of the formula: $-SO_2-$ is selected from the group consisting of diaminodiphenylsulfones, bis(aminophenoxyphenyl) sulfones, diaminodiphenylenesulfones, and diaminothioxanthenes.

10. The hollow filamentary membrane as claimed in claim 6, wherein the aromatic diamine having at least one divalent radical of the formula: $-C(CF_3)_2-$ is selected from the group consisting of 2,2-bis(aminophenyl) hexafluoropropane compounds and 2,2-bis(aminophenoxyphenyl) hexafluoropropane compounds.

11. The hollow filamentary membrane as claimed in claim 1, wherein the hollow filamentary microporous inner layer has an average porosity of from 45 to 70% by volume, and the tubular filamentary asymmetry outer layer has an average porosity from 55 to 75% by volume and of 2 to 10% by volume larger than that of the inner layer.

12. A process for producing an aromatic polyimide double hollow filamentary membrane, comprising the steps of:
  (1) feeding a first spinning dope solution of a first aromatic imide polymer soluble in organic solvents in a concentration of 5 to 35% by weight in an organic solvent to an inner annular extruding opening of a hollow filament-spinning nozzle;
  (2) feeding a second spinning dope solution of a second aromatic imide polymer soluble in organic solvents in a concentration of 1 to 25% by weight in an organic solvent to an outer annular extruding opening formed around and concentrically with the inner annular extruding opening, the concentration of the first aromatic imide polymer in the first spinning dope solution being 0.5% to 10% by weight above the concentration of the second aromatic imide polymer in the second spinning type solution,
  (3) concurrently extruding the first and second spinning dope solutions through the inner and outer annular extruding openings, respectively, while concurrently drafting the extruded first and second hollow filamentary streams of the first and second spinning dope solutions to allow the first and second hollow filamentary streams to be concentrically united with each other into a double layered hollow filamentary stream; and
  (4) bringing the double layered hollow filamentary stream into contact with a coagulating liquid to solidify the double layered stream and to form an aromatic polyimide double layered hollow filamentary membrane, wherein said aromatic polyimide double hollow membrane has an inner layer having a thickness of 10 to 500 μm, an intermediate layer having a thickness of 2 to 200 μm and a dense outside surface layer having a thickness of no more than 1 μm.

13. The process as claimed in claim 12, wherein the feeding steps (1) and (2) and the extruding step (3) are carried out at a temperature of the first and second spinning dope solutions of from 20° C. to 150° C.

14. The process as claimed in claim 12, wherein the second spinning dope solution has a rotation viscosity of about 1 to 20,000 poises at the extruding temperature.

15. The process as claimed in claim 12, wherein the first spinning dope solution has a rotation viscosity of 1.01 to 10 times that of the second spinning dope solution at a temperature of 100° C.

16. The process as claimed in claim 12, wherein a ratio in extruding rate of the second spinning dope solution to the first spinning dope solution is from 1:60 to 1:1.5.

17. The process as claimed in claim 12, wherein a ratio in width of the outer annular extruding opening to the inner annular extruding opening is from 5:1 to 1:10.

18. The process as claimed in claim 12, wherein the organic solvents in the first and second spinning dope solutions consist essentially of at least one member selected from the group consisting of phenol compounds, catechol compounds, halogenated phenol compounds, N-methyl-2-pyrrolidone, N,N-dimethylformamide, N,N-dimethylacetamide, N,N-diethylformamide, N,N-diethylacetamide, and dimethylsulfoxide.

19. The process as claimed in claim 12, wherein the coagulating liquid comprises at least one member selected from the group consisting of water, lower aliphatic alcohols, and lower aliphatic ketones.

20. The process as claimed in claim 12, wherein the coagulating liquid has a temperature of −10° C. to 60° C.

21. The process as claimed in claim 12, wherein the resultant aromatic polyimide double layered hollow filamentary membrane is taken up at a velocity of about 2 to 80 m/min.

* * * * *

UNITED STATES PATENT AND TRADEMARK OFFICE
CERTIFICATE OF CORRECTION

PATENT NO. : 5,141,642
DATED : August 25, 1992
INVENTOR(S) : Yoshihiro KUSUKI et al.

It is certified that error appears in the above-identified patent and that said Letters Patent is hereby corrected as shown below:

Claim 8, column 19, line 28, "diaminodipheylenesulfones" should read --diaminodiphenylenesulfones--.

Claim 12, column 20, line 5, "type" should read --dope--.

Signed and Sealed this

Tenth Day of May, 1994

*Attest:*

BRUCE LEHMAN

*Attesting Officer*   *Commissioner of Patents and Trademarks*